UNITED STATES PATENT OFFICE.

FRIEDRICH RUNKEL AND MARTIN HERZBERG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

950,404.  Specification of Letters Patent.  Patented Feb. 22, 1910.

No Drawing.  Application filed July 22, 1909. Serial No. 508,985.

*To all whom it may concern:*

Be it known that we, FRIEDRICH RUNKEL and MARTIN HERZBERG, doctors of philosophy, chemists, citizens of the German Empire, residing at Elberfeld, Germany, have invented new and useful Improvements in Azo Dyes, of which the following is a specification.

Our applications Serial No. 490,226 and Serial No. 490,227 relate to the manufacture and production of new azo dyes which can be obtained by combining the diazo compounds of one molecule of aminophenylethers or their homologues and one molecule of any other diazo compound in any course of succession with one molecule of a periamino-naphthol sulfonic acid. The new dyestuffs thus obtained dye wool from blue to green to black shades remarkable for their fastness to washing and to milling alongside with cotton and wool. We have now found that dyestuffs of the same valuable properties can be obtained on using in the above mentioned process halogen substituted derivatives of aminophenylethers or their homologues e. g. ortho-amino-para-chlorophenylether, ortho-amino-para-chlorophenyl-meta-tolylether, ortho-amino-para-chlorophenyl-para-tolylether, ortho-amino-ortho$^1$-chlorophenylether, ortho-amino-para$^1$-chlorophenylether, ortho - amino-para-chlorophenyl - ortho$^1$ - chlorophenylether, ortho-amino-para-chlorophenyl - para$^1$ - chlorophenylether, para-amino - ortho$^1$-chlorophenylether, para - amino - para$^1$ - chlorophenylether, para-amino-ortho-chlorophenyl-para$^1$-chlorophenylether, which can e. g. be obtained by the process described in *Berichte der Deutschen Chemischen Gesellschaft* 29 p. 1446.

The new dyestuffs are after being dried and pulverized in the shape of their sodium salts dark powders soluble in water. Upon reduction with stannous chlorid and hydrochloric acid they are decomposed, a halogen substituted aminophenylether an amino compound and a diamino - 1.8-aminonaphthol sulfonic acid are obtained. The new coloring matters dye wool from blue to green to black shades remarkable for their fastness to washing and to milling.

In order to illustrate the new process more fully the following examples are given, the parts being by weight:—

Example 1: 22 parts of para-chloro-ortho-aminophenylether are dissolved in a hot mixture of 90 parts of concentrated hydrochloric acid and 350 parts of water. The ether is then quickly diazotized in the usual way. After cooling the hydrochloric acid is neutralized with soda so that the mixture is only weakly acid and the diazo compound is introduced into a cold aqueous weakly acid solution of 31.9 parts of 1.8.4.6-aminonaphthol disulfonic acid. It is stirred for some hours at the ordinary temperature. After the addition of soda 13.8 parts of diazotized meta-nitranilin are then added. The dyestuff which precipitates is filtered off, washed with alkaline water and dried. It dyes wool from acid baths black shades.

Example 2: 16.2 parts of 2.5-dichloroanilin are dissolved in 160 parts of hot water and 160 parts of hot crude hydrochloric acid, ice is added and the dichloroanilin is diazotized with 7.1 parts of sodium nitrate. 50 per cent. of the excess of hydrochloric acid is then neutralized with sodium carbonate and 31.9 parts of freshly precipitated 1.8.3.6-aminonaphthol disulfonic acid are added to the mass of the reaction which has to be stirred for about 10 hours. After it has been rendered alkaline with sodium carbonate the diazo compound of 22 parts of para-amino-para$^1$-chlorophenylether:

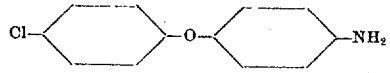

is added. After some time the precipitated dye is filtered off, redissolved from hot water, filtered off, pressed and dried. It is after being dried and pulverized in the shape of its sodium salt a dark powder soluble in water with a blue color and soluble in concentrated sulfuric acid with a dark blue color. Upon reduction with stannous chlorid and hydrochloric acid the new dye is decomposed, 2.5-dichloroanilin, para-amino - para$^1$ - chloro - phenylether and 1.2.7-triamino-8-naphthol-3.6-disulfonic acid are obtained. The new dyestuff dyes wool blue-black shades fast to washing and to milling.

The process is carried out in an analogous manner for the production of other of the above mentioned dyestuffs e. g. from 1.8-aminonaphthol-4- or 5-sulfonic acid etc.

We claim:

1. The herein described new diazo dyestuffs obtainable from 1 molecule of a diazotized halogen substituted aminoarylether, 1 molecule of another diazo compound and 1 molecule of a 1.8-aminonaphthol sulfonic acid, which are after being dried and pulverized in the shape of their sodium salts dark powders soluble in water; yielding upon reduction with stannous chlorid and hydrochloric acid a halogen substituted aminoarylether, another amino compound and a diamino-1.8-aminonaphthol sulfonic acid; and dyeing wool from blue to green to black shades remarkable for their fastness to washing and to milling, substantially as described.

2. The herein described new diazo dyestuff obtainable from diazotized dichloroanilin, diazotized para-amino-para$^1$-chlorophenylether and 1.8-aminonaphthol-3.6-disulfonic acid, which dye is after being dried and pulverized in the shape of its sodium salt a dark powder soluble in water with a blue color and soluble in concentrated sulfuric acid with a dark blue color; yielding upon reduction with stannous chlorid and hydrochloric acid para-amino-para$^1$-chloro-phenylether, dichloroanilin and 1.2.7-triamino-8-naphthol-3.6-disulfonic acid; and dyeing wool blue-black shades remarkable for their fastness to washing and to milling, substantially as described.

In testimony whereof we have hereunto set our hands in the presence of two subscribing witnesses.

FRIEDRICH RUNKEL. [L. S.]
MARTIN HERZBERG. [L. S.]

Witnesses:
OTTO KÖNIG,
WILLY KLEIN.

---

Corrections in Letters Patent No. 950,404.

It is hereby certified that in Letters Patent No. 950,404, granted February 22, 1910, upon the application of Friedrich Runkel and Martin Herzberg, of Elberfeld, Germany, for an improvement in "Azo Dyes," errors appear in the printed specification requiring correction as follows: Page 1, line 76, the word "nitrate" should read *nitrite*, and same page, lines 78 and 90, the word "is" should read *are*; and that the said Letters Patent should be read with these corrections therein that the same may conform to the record of the case in the Patent Office.

Signed and sealed this 26th day of April, A. D., 1910.

[SEAL.]

C. C. BILLINGS,
*Acting Commissioner of Patents.*

1. The herein described new diazo dyestuffs obtainable from 1 molecule of a diazotized halogen substituted aminoarylether, 1 molecule of another diazo compound and 1 molecule of a 1.8-aminonaphthol sulfonic acid, which are after being dried and pulverized in the shape of their sodium salts dark powders soluble in water; yielding upon reduction with stannous chlorid and hydrochloric acid a halogen substituted aminoarylether, another amino compound and a diamino-1.8-aminonaphthol sulfonic acid; and dyeing wool from blue to green to black shades remarkable for their fastness to washing and to milling, substantially as described.

2. The herein described new diazo dyestuff obtainable from diazotized dichloroanilin, diazotized para-amino-para$^1$-chloro-phenylether and 1.8-aminonaphthol-3.6-disulfonic acid, which dye is after being dried and pulverized in the shape of its sodium salt a dark powder soluble in water with a blue color and soluble in concentrated sulfuric acid with a dark blue color; yielding upon reduction with stannous chlorid and hydrochloric acid para-amino-para$^1$-chloro-phenylether, dichloroanilin and 1.2.7-triamino-8-naphthol-3.6-disulfonic acid; and dyeing wool blue-black shades remarkable for their fastness to washing and to milling, substantially as described.

In testimony whereof we have hereunto set our hands in the presence of two subscribing witnesses.

FRIEDRICH RUNKEL. [L. S.]
MARTIN HERZBERG. [L. S.]

Witnesses:
OTTO KÖNIG,
WILLY KLEIN.

---

It is hereby certified that in Letters Patent No. 950,404, granted February 22, 1910, upon the application of Friedrich Runkel and Martin Herzberg, of Elberfeld, Germany, for an improvement in "Azo Dyes," errors appear in the printed specification requiring correction as follows: Page 1, line 76, the word "nitrate" should read *nitrite*, and same page, lines 78 and 90, the word "is" should read *are;* and that the said Letters Patent should be read with these corrections therein that the same may conform to the record of the case in the Patent Office.

Signed and sealed this 26th day of April, A. D., 1910.

[SEAL.]

C. C. BILLINGS,
*Acting Commissioner of Patents.*

It is hereby certified that in Letters Patent No. 950,404, granted February 22, 1910, upon the application of Friedrich Runkel and Martin Herzberg, of Elberfeld, Germany, for an improvement in "Azo Dyes," errors appear in the printed specification requiring correction as follows: Page 1, line 76, the word "nitrate" should read *nitrite*, and same page, lines 78 and 90, the word "is" should read *are;* and that the said Letters Patent should be read with these corrections therein that the same may conform to the record of the case in the Patent Office.

Signed and sealed this 26th day of April, A. D., 1910.

[SEAL.]

C. C. BILLINGS,

*Acting Commissioner of Patents.*